United States Patent [19]

Takayama

[11] Patent Number: 5,260,790
[45] Date of Patent: Nov. 9, 1993

[54] SYNCHRONIZING SIGNAL SEPARATION DEVICE

[75] Inventor: Makoto Takayama, Yokohama, Japan

[73] Assignee: Canon Kabushiki Kaisha, Tokyo, Japan

[21] Appl. No.: 740,302

[22] Filed: Aug. 5, 1991

[30] Foreign Application Priority Data

Aug. 27, 1990 [JP] Japan .................................. 2-226022
Aug. 27, 1990 [JP] Japan .................................. 2-226023

[51] Int. Cl.⁵ .............................................. H04N 5/08
[52] U.S. Cl. .................................................. 358/153
[58] Field of Search ............... 358/153, 154, 155, 319, 358/320

[56] References Cited

U.S. PATENT DOCUMENTS

| | | | |
|---|---|---|---|
| 4,081,833 | 3/1978 | Akiyama | 358/153 |
| 4,303,939 | 12/1981 | Stephens et al. | 358/153 X |
| 4,385,319 | 5/1983 | Hasegawa | 358/153 |
| 4,506,297 | 3/1985 | Elmis | 358/153 |
| 4,918,525 | 4/1990 | Vladkov | 358/153 |
| 4,942,469 | 7/1990 | Kanai | 358/153 |
| 5,105,272 | 4/1992 | Kanai | 358/153 |

FOREIGN PATENT DOCUMENTS

| | | | |
|---|---|---|---|
| 0034382 | 3/1980 | Japan | 358/153 |
| 0177079 | 10/1983 | Japan | 358/153 |
| 0010366 | 1/1986 | Japan | 358/153 |

Primary Examiner—Victor R. Kostak
Attorney, Agent, or Firm—Fitzpatrick, Cella, Harper & Scinto

[57] ABSTRACT

A synchronizing signal separation device separates a synchronizing signal from an input signal which includes the synchronizing signal. The device includes a peak clamp circuit for receiving and peak-clamping the input signal, and a pulse clamp circuit for pulse-clamping the input signal. The device is configured so as to separate the synchronizing signal from the input signal by comparing the signal clamped by any of the peak clamp circuit and the pulse clamp circuit with a predetermined level. It is thereby possible to separate an exact synchronizing signal without being influenced by deterioration of the waveform of the input signal.

10 Claims, 6 Drawing Sheets

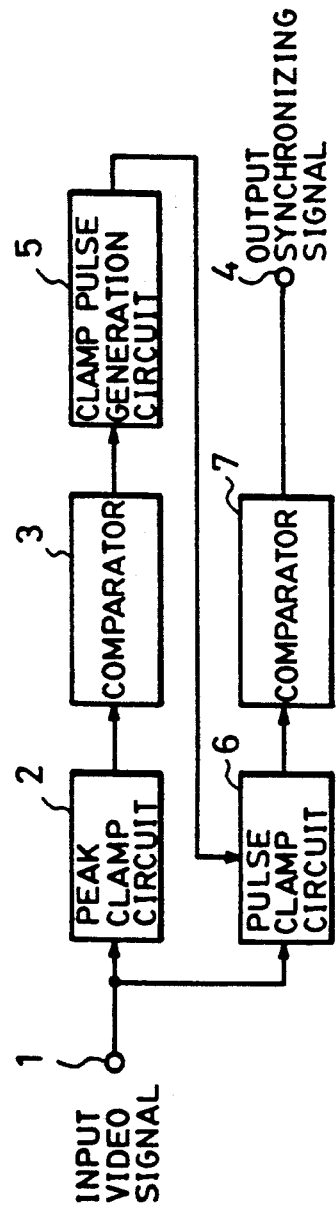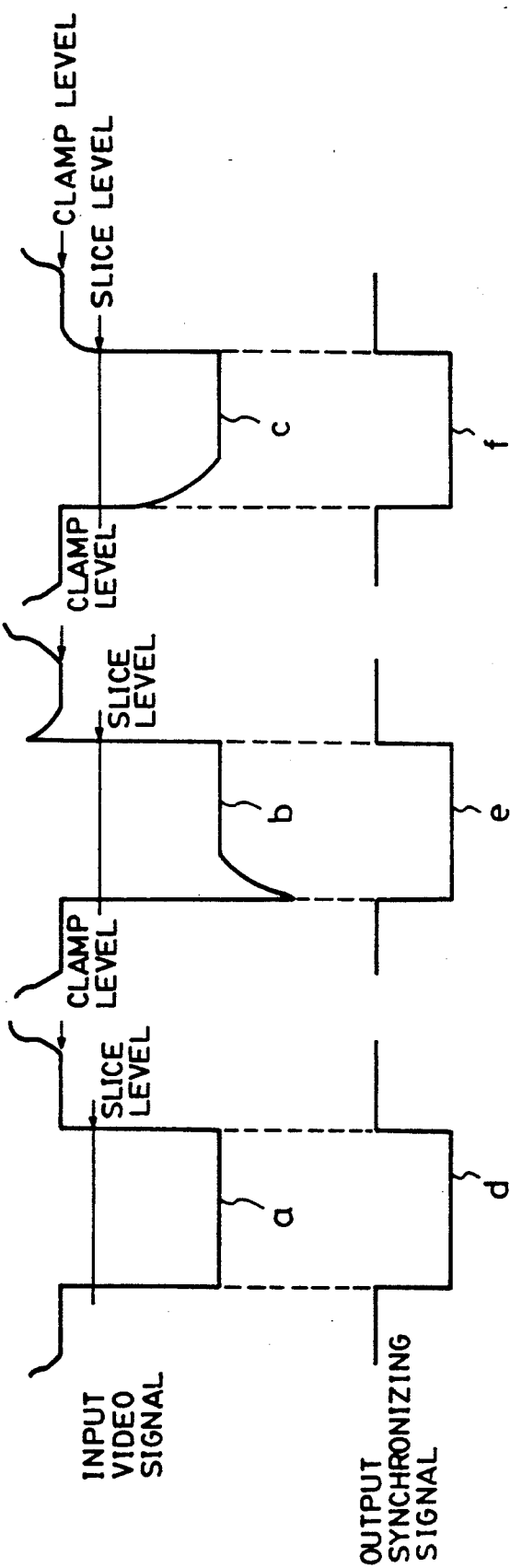
FIG. 8
FIG. 9

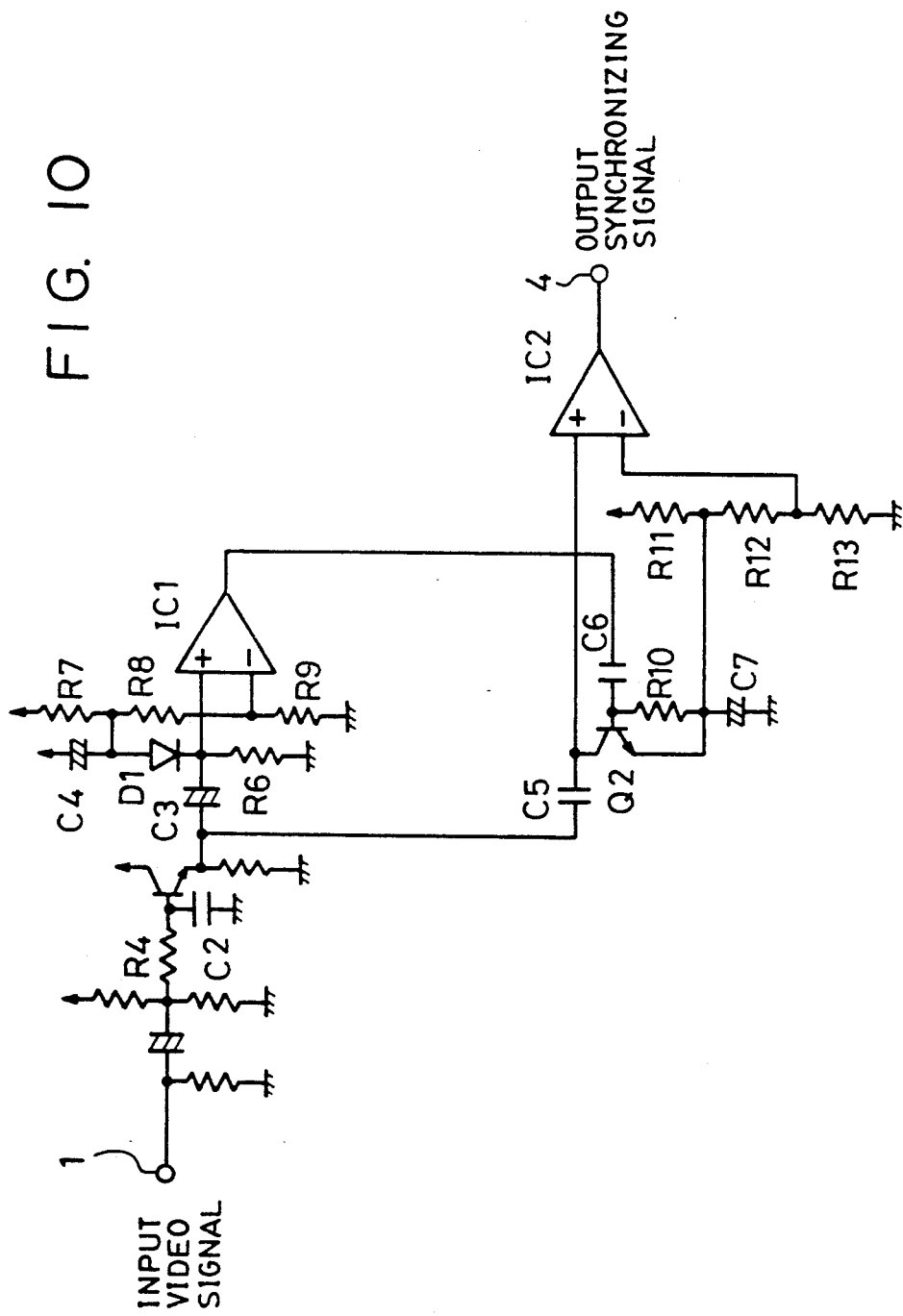

SYNCHRONIZING SIGNAL SEPARATION DEVICE

BACKGROUND OF THE INVENTION

1. Field of the Invention

This invention relates to a synchronizing signal separation device which separates a synchronizing signal from an input signal which includes the synchronizing signal.

2. Description of the Prior Art

A conventional synchronizing signal separation device for separating a synchronizing signal from a signal, such as a video signal, to which the synchronizing signal is added, is configured as shown in FIG. 1.

FIG. 1 is a diagram showing the configuration of a conventional synchronizing signal separation device. In FIG. 1, a video signal is input to input terminal 1. The front end of a synchronizing-signal portion in the video signal is clamped by a peak clamp circuit 2 to a preset clamp level, as represented by "a" in FIG. 2. The video signal is then supplied to a comparator 3, which provides a synchronizing signal as represented by d in FIG. 2 by comparing the supplied video signal with a slice level set to a more or less higher level than the clamp level, and outputs the synchronizing signal from output terminal 4.

However, in a video cassette recorder, a still-picture video system or the like, which records a video signal on a recording medium, such as a magnetic tape, a magnetic disk or the like, and reproduces the video signal recorded on the recording medium, an overshoot as represented by b in FIG. 2 or a smear as represented by c in FIG. 2 is produced in the synchronizing signal due to emphasizing or deemphasizing processing performed when recording or reproducing the video signal, deteriorating the waveform of the signal. As a result, the synchronizing signal output from the output terminal 4 shown in FIG. 1 becomes as represented by e or f in FIG. 2.

That is, if an overshoot is produced in the waveform of the synchronizing signal, as represented by b in FIG. 2, the rise time of the waveform of the synchronizing signal separated by the synchronizing signal separation device shown in FIG. 1 starts earlier than the original rise time. If a smear is produced in the waveform of the synchronizing signal, as represented by c in FIG. 2, the fall time of the waveform of the synchronizing signal separated by the synchronizing signal separation device shown in FIG. 1 becomes later than the original fall time. Hence, it is difficult to provide an exact synchronizing signal.

SUMMARY OF THE INVENTION

It is an object of the present invention to provide a synchronizing signal separation device which can solve the above-described problems.

It is another object of the present invention to provide a synchronizing signal separation device which can stably separate a synchronizing signal from an input signal without being influenced by deterioration of the waveform of the input signal.

These objects are accomplished, according to one aspect of the present invention, by a synchronizing signal separation device for separating a synchronizing signal from an input signal which includes the synchronizing signal, comprising a peak clamp circuit for inputting the input signal and peak-clamping the input signal, a pulse clamp circuit for inputting the input signal and pulse-clamping the input signal, and a comparison circuit for outputting the synchronizing signal by comparing the signal clamped by any of the peak clamp circuit and the pulse clamp circuit with a predetermined level.

It is still another object of the present invention to provide a synchronizing signal separation device which can exactly separate a synchronizing signal from an input signal without being influenced by deterioration of the waveform of the input signal.

This object is accomplished, according to another aspect of the present invention, by a synchronizing signal separation device for separating a synchronizing signal from an input signal which includes the synchronizing signal, comprising a peak clamp circuit for inputting the input signal and peak-clamping the input signal, a clamp pulse generation circuit for generating a clamp pulse in accordance with the signal peak-clamped by the peak clamp circuit, a pulse clamp circuit for inputting the input signal and pulse-clamping the input signal in accordance with the clamp pulse generated by the clamp pulse generation circuit, and a comparison circuit for outputting the synchronizing signal by comparing the signal clamped by the pulse clamp circuit with a predetermined level.

These and other objects and features of the present invention will become more apparent from the following detailed description of the preferred embodiments taken in connection with the accompanying drawings.

BRIEF DESCRIPTION OF THE DRAWINGS

FIG. 8 is a diagram showing the schematic configuration of a synchronizing signal separation device according to another embodiment of the present invention;

FIG. 9 illustrates signal waveforms in respective units of the device in order to explain the operation of the synchronizing signal separation device shown in FIG. 8; and FIG. 10 illustrates a specific circuit configuration of the synchronizing signal separation device shown in FIG. 8.

DETAILED DESCRIPTION OF THE PREFERRED EMBODIMENTS

The present invention will now be explained with reference to the preferred embodiment of the invention.

Figure 3:
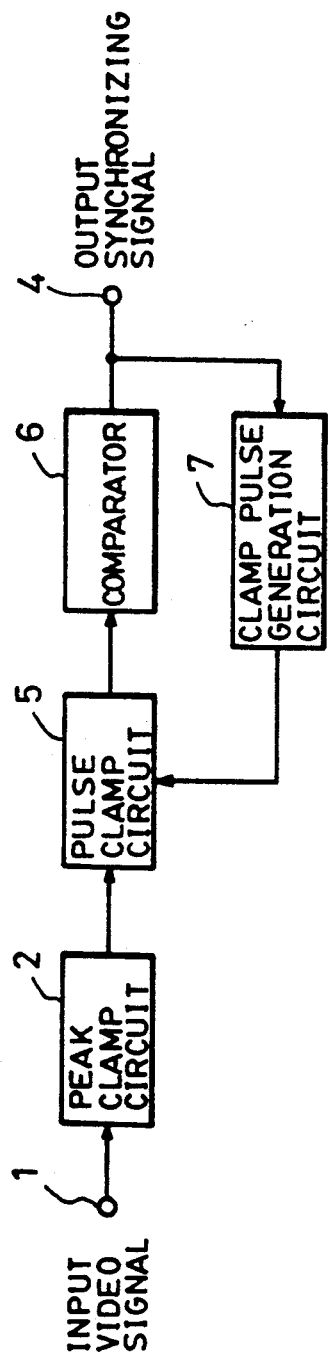
FIG. 3 is a diagram showing the schematic configuration of a synchronizing signal separation device according to an embodiment of the present invention.

FIG. 3 is a diagram showing the schematic configuration of a synchronizing signal separation device according to an embodiment of the present invention.

Figure 1:
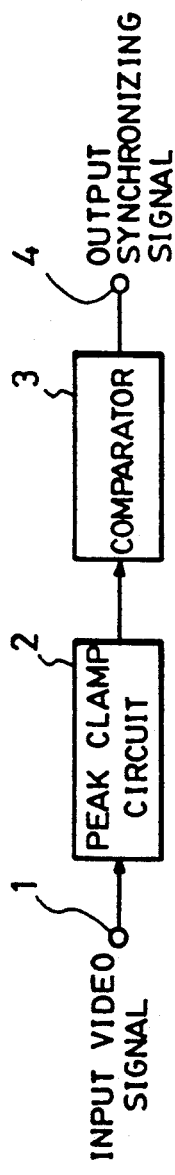
FIG. 1 is a diagram showing the schematic configuration of a conventional synchronizing signal separation device.

In FIG. 3, like constituents as those of the synchronizing signal separation device shown in FIG. 1 are indicated by like numerals, and a detailed explanation thereof will be omitted.

In FIG. 3, a pulse clamp circuit 5 operates in accordance with a clamp pulse output from a clamp pulse generation circuit 7. For example, when a synchronizing signal is not output from a comparator 6 (to be described later), such as when a power supply of the device is turned on, when the supply of the video signal to the input terminal 1 is started, or the like, the pulse clamp circuit 5 does not operate, since a clamp pulse is not generated from the clamp pulse generation circuit 7. Hence, the pulse clamp circuit 5 outputs an input signal as it is. In such a case, the front end of a synchronizing-signal portion included in the video signal input from the input terminal 1 is clamped to a preset clamp level by the peak clamp circuit 2. The clamped signal is supplied to the comparator 6 via the pulse clamp circuit 5 in a non-operating state.

The comparator 6 separates the synchronizing signal by comparing the level of the input signal with a slice level set to a more or less higher level than the clamp level for the peak clamp circuit 5, outputs the separated synchronizing signal from the output terminal 4, and at the same time supplies the clamp pulse generation circuit 7 with the synchronizing signal.

When the power supply of the device is turned on, and the synchronizing signal is output from the comparator 6 and supplied to the clamp pulse generation circuit 7, as described above, the clamp pulse generation circuit 7 generates a clamp pulse for clamping a portion corresponding to a back porch of the synchronizing signal in synchronization with the input synchronizing signal, and supplies the pulse clamp circuit 5 with the clamp pulse.

Figure 4:
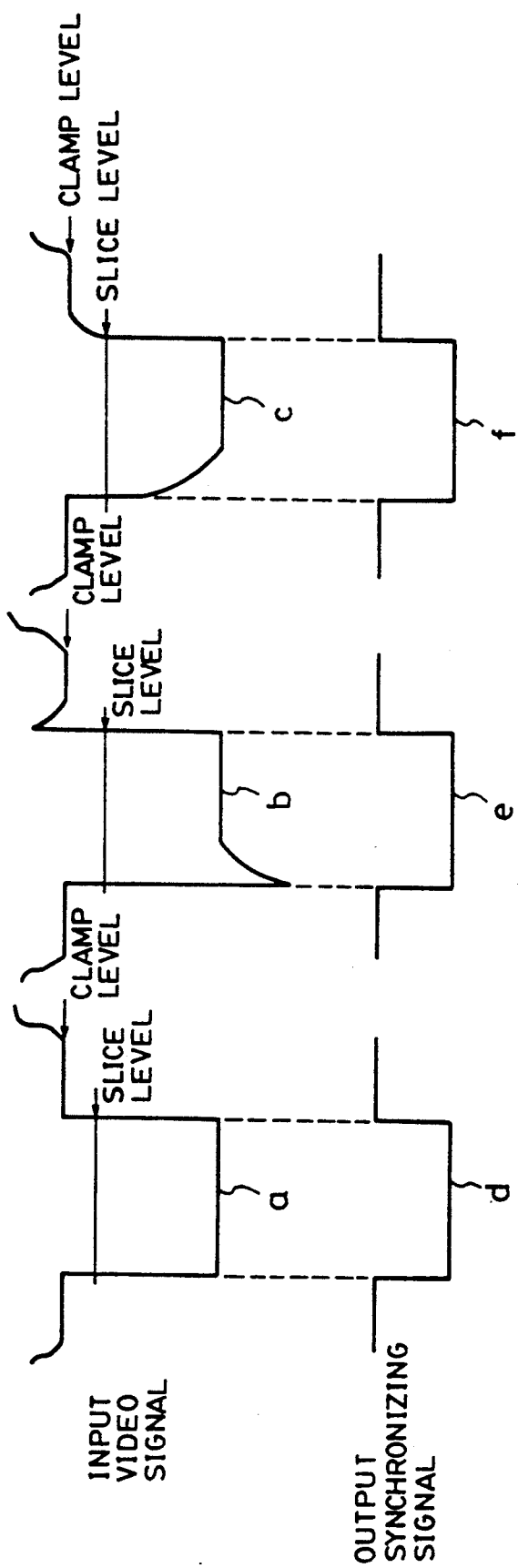
FIG. 4 is a diagram showing signal waveforms in respective units of the device in order to explain the operation of the synchronizing signal separation device shown in FIG. 3.

The pulse clamp circuit 5 pedestal-clamps the signal output from the peak clamp circuit 2 in the preceding stage to a level preset in accordance with the clamp pulse output from the clamp pulse generation circuit 7, whereby a pedestal portion of the video signal is stably maintained at a predetermined level even if the waveform of the input synchronizing signal is deteriorated, as represented by b and c in FIG. 4.

The comparator 6 then compares the video signal clamped by the pulse clamp circuit 5 with a slice level set to a more or less lower level than the clamp level for the pulse clamp circuit 6, whereby synchronizing signals as represented by d, e and f in FIG. 4 are separated and output.

As described above, the device is configured so that after pulse-clamping the pedestal level of the video signal by the pulse clamp circuit 5, the clamped video signal is compared with the slice level which is more or less lower than the pedestal level, and the synchronizing signal is separated. It is thereby possible to exactly separate the synchronizing signal even if an overshoot is produced as represented by b in FIG. 4, or a smear is produced as represented by c in FIG. 4, as well as when no deterioration is present in the signal waveform as represented by "a" in FIG. 4. Furthermore, even if the synchronizing signal is not separated and output, such as when the power supply of the device is turned on, when the input of the video signal is started, or the like, the separation of the synchronizing signal by the peak clamp circuit 2 and the comparator 6 is performed. After the synchronizing signal has been once output, the separation of the synchronizing signal by the pulse clamp circuit 5 and the comparator 6 is performed. Hence, it is possible to separate a stable synchronizing signal having little deterioration in its waveform near its pedestal portion.

Figure 5:
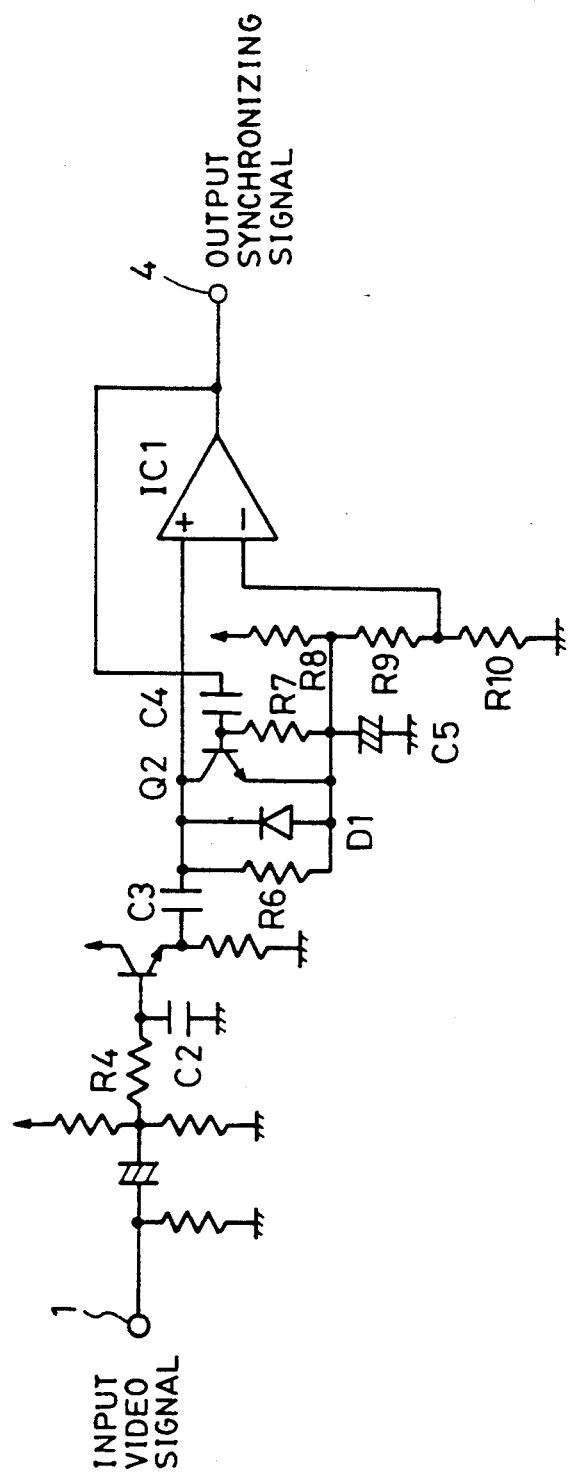
FIGS. 5–7 illustrate specific circuit configurations of the synchronizing signal separation circuit shown in FIG. 3.

FIG. 5 illustrates a specific circuit configuration of the synchronizing signal separation device shown in FIG. 3.

In FIG. 5, when the synchronizing signal is not output from the output terminal 4, such as when the power supply of the device is turned on, when the supply of the video signal to the input terminal 1 is started, or the like, high-frequency components in the video signal input from the input terminal 1 are removed by a low-pass filter (LPF) comprising resistor R4 and capacitor C2, and the front-end portion of the synchronizing signal is then clamped to a preset peak clamp level by a peak clamp circuit comprising capacitors C3 and C5, resistors R6, R8–R10, and diode D1. Subsequently, a comparator IC1 compares the clamped video signal with a slice level having a voltage more or less higher than the peak clamp level due to potential division by the resistors R8–R10, whereby the synchronizing signal is output from the output terminal 4.

Once the synchronizing signal is output from the output terminal 4, the video signal from which high-frequency components have been removed by the LPF is clamped by a pulse clamp circuit comprising capacitors C3–C5, resistors R7–R10, and transistor Q2. A clamp pulse from the pulse clamp circuit is formed by capacitor C4 and resistor R7 from the synchronizing signal output from the comparator IC1, is synchronized with the start of the rise time of the synchronizing signal, and clamps the pedestal portion of the video signal.

The pedestal level of the signal output from the LPF is fixed by the pulse clamp circuit operating according to the clamp pulse. The comparator IC1 compares the signal with a slice level having a voltage more or less lower than the pedestal level due to potential division by the resistors R8–R10, whereby the synchronizing signal is output from the output terminal 4.

The resistors R8–R10 have values predetermined so as to set a slice level having a voltage more or less higher than the peak clamp level when the synchronizing signal is not output from the output terminal 4, and to set a slice having a voltage more or less lower than the pedestal level when the synchronizing signal is output from the output terminal 4.

As explained above, according to the synchronizing signal separation device having the circuit configuration as shown in FIG. 5, the synchronizing signal is separated by the peak clamp circuit and the comparator when the synchronizing signal is not output, such as when the power supply of the device is turned on, immediately after the input of the video signal is started, or the like. After the synchronizing signal has been once output, the synchronizing signal is separated by the pulse clamp circuit and the comparator. It is thereby possible to separate a stable synchronizing signal having little deterioration in its waveform near its pedestal portion.

Figure 6:
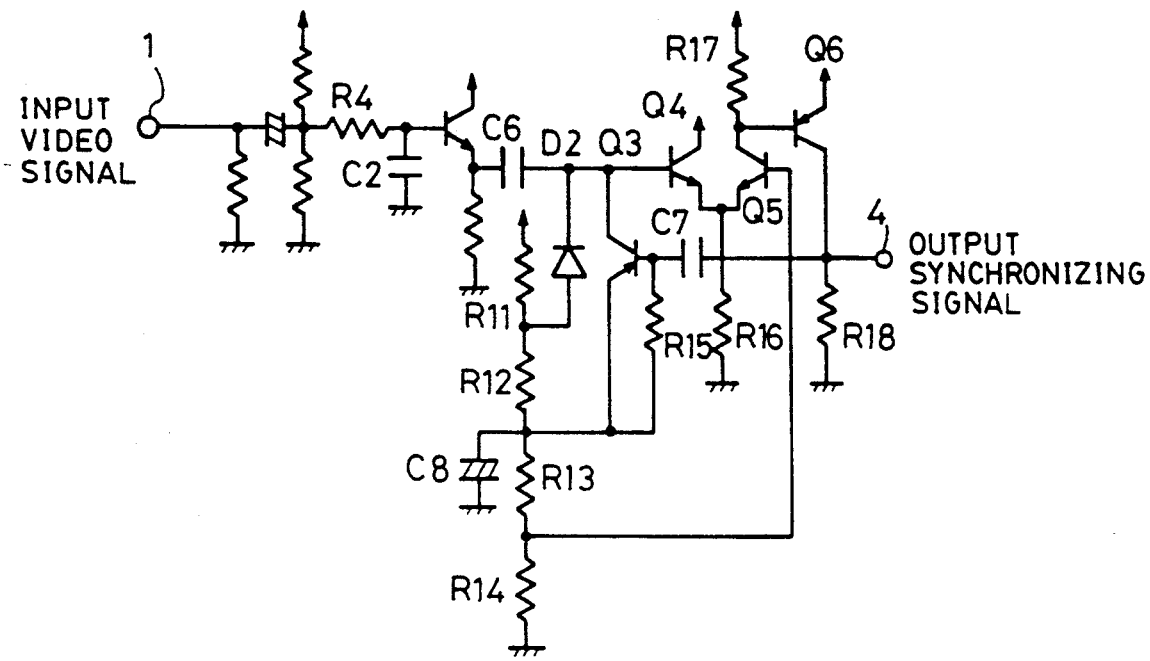
Figure 7:
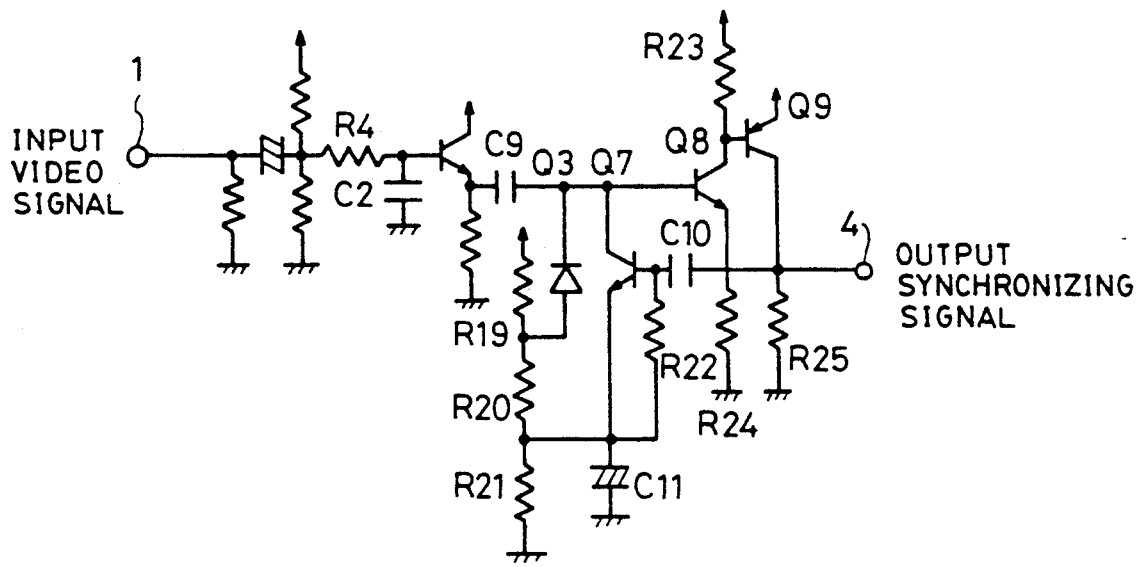

The synchronizing signal separation device of the present invention is not limited to the circuit configuration shown in FIG. 5, but may have a circuit configuration as shown in FIG. 6 or 7, whereby the same effect may be obtained.

In the circuit configuration shown in FIG. 6, the comparator IC1 shown in FIG. 5 is replaced by transistors Q4–Q6 and resistors R16–R18. In the circuit configuration shown in FIG. 7, the comparator IC1 shown in FIG. 5 is replaced by transistors Q8 and Q9, and resistors R23-R25.

As explained above, according to the present embodiment, it is possible to provide a synchronizing signal separation device which can stably separate a synchronizing signal from an input signal without being influenced by deterioration of the waveform of the input signal.

An explanation will now be provided of another embodiment of the present invention.

FIG. 8 is a diagram showing the schematic configuration of a synchronizing signal separation device according to another embodiment of the present invention.

In FIG. 8, like constituents as those in the synchronizing signal separation device shown in FIG. 1 are indicated by like numerals.

Figure 2:
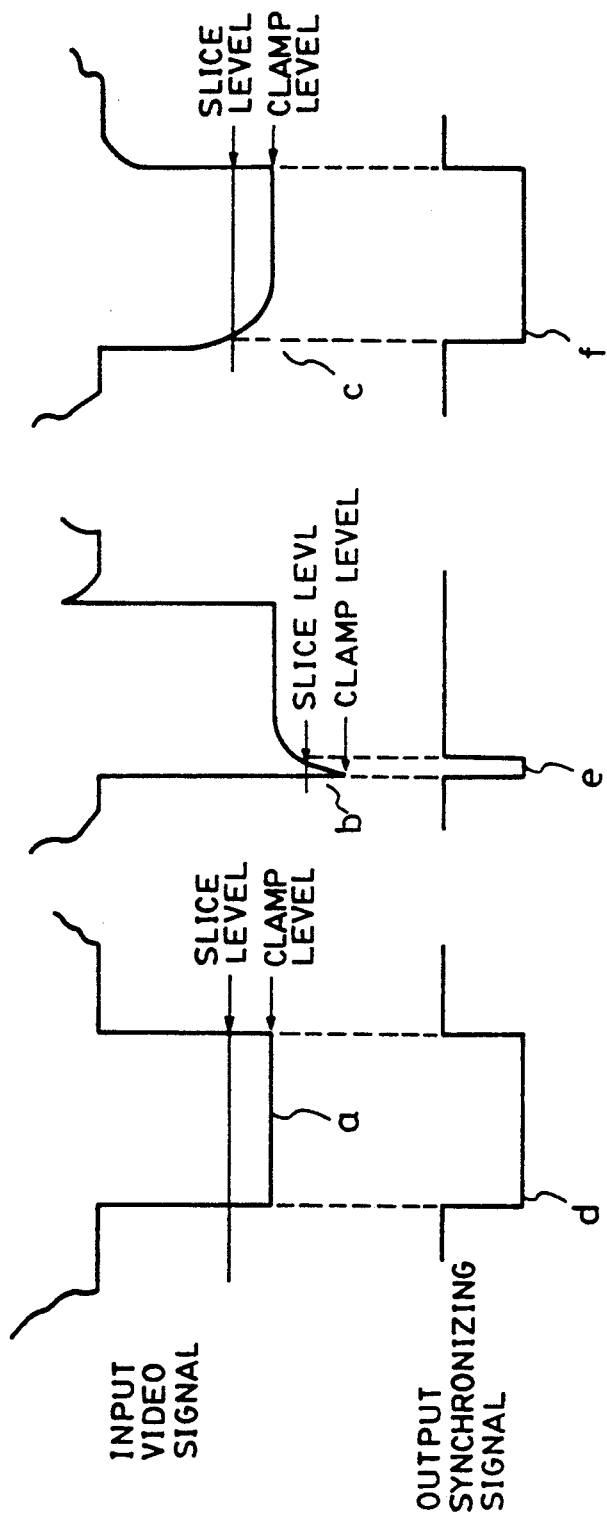
FIG. 2 illustrates signal waveforms in respective units of the device in order to explain the operation of the synchronizing signal separation device shown in FIG. 1.

In FIG. 8, the front end of a synchronizing-signal portion in the video signal input from the input terminal 1 is clamped to a preset clamp level by the peak clamp circuit 2, as represented by "a" in FIG. 2. The clamped signal is then supplied to the comparator 3, which provides a synchronizing signal as represented by d in FIG. 2 by comparing the supplied signal with a slice level set to a more or less higher level than the clamp level, and supplies a clamp pulse generation circuit 5 with the synchronizing signal.

The clamp pulse generation circuit 5 generates a clamp pulse with a timing of the back porch of the synchronizing signal in synchronization with the synchronizing signal supplied from the comparator 3, and supplies a pulse clamp circuit 6 with the clamp pulse.

The video signal input from the input terminal 1 is supplied to the pulse clamp circuit 6. The pulse clamp circuit 6 pedestal-clamps the supplied video signal to a level preset in accordance with the clamp pulse output from the clamp pulse generation circuit 5, whereby the pedestal portion of the video signal is stably maintained at a predetermined level even if the waveform of the input synchronizing signal is deteriorated, as represented by b and c in FIG. 9.

A comparator 7 compares the video signal clamped by the pulse clamp circuit 6 in the preceding stage with a slice level set to a more or less lower level than the clamp level for the pulse clamp circuit 6, whereby synchronizing signals as represented by d, e and f in FIG. 9 are separated and output.

As described above, the device is configured so that after pulse-clamping the pedestal level of the video signal by the pulse clamp circuit 6, the clamped video signal is compared with the slice level which is more or less lower than the pedestal level, and the synchronizing signal is separated. It is thereby possible to exactly separate the synchronizing signal even if an overshoot is produced as represented by b in FIG. 9, or a smear is produced as represented by c in FIG. 9, as well as when no deterioration is present in the signal waveform as represented by "a" in FIG. 9.

FIG. 10 illustrates a specific circuit configuration of the synchronizing signal separation device shown in FIG. 8.

In FIG. 10, high-frequency components in the video signal input from the input terminal 1 are removed by a low-pass filter (LPF) comprising resistor R4 and capacitor C2, and the front-end portion of the synchronizing signal is then clamped to a preset peak clamp level by a peak clamp circuit comprising capacitors C3 and C4, resistors R6-R9, and diode D1. Subsequently, a comparator IC1 compares the clamped video signal with a slice level having a voltage more or less higher than the peak clamp level due to potential division by the resistors R7-R9, whereby the synchronizing signal is separated.

In FIG. 10, capacitors C5-C7, resistors R10-R13, and transistor Q2 constitute a pulse clamp circuit. A clamp pulse from the pulse clamp circuit is formed by capacitor C6 and resistor R10 from the synchronizing signal output from the comparator IC1, is synchronized with the start of the rise time of the synchronizing signal, and clamps the pedestal portion of the video signal.

The pedestal level of the signal output from the LPF is fixed by the pulse clamp circuit operating by the clamp pulse. A comparator IC2 compares the signal with a slice level having a voltage more or less lower than the pedestal level due to potential division by the resistors R11-R13, whereby the synchronizing signal is output from the output terminal 4.

The resistors R7-R9 have values predetermined so as to set a slice level having a voltage more or less higher than the peak clamp level, and the resistors R11-R13 have values predetermined so as to set a slice level having a voltage more or less lower than the pedestal level.

As explained above, according to the synchronizing signal separation device having the circuit configuration as shown in FIG. 10, the clamp pulse for clamping the pedestal portion of the video signal is formed from the synchronizing signal separated from the video signal peak-clamped by the peak clamp circuit, and the pulse clamp circuit operating by the clamp pulse then separates the synchronizing signal from the pulse-clamped video signal and outputs the synchronizing signal. It becomes thereby possible to separate the synchronizing signal near the pedestal having little deterioration in the waveform of the synchronizing signal, and to separate an exact and stable synchronizing signal from the video signal in spite of deterioration of the waveform of the signal.

As explained above, according to the present embodiment, it is possible to provide a synchronizing signal separation device which can exactly separate a synchronizing signal from an input signal without being influenced by deterioration in the waveform of the input signal.

The individual components shown in outline or designated by blocks in the Drawings are all well-known in the synchronizing signal separation arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information signal processing device for separating a synchronizing signal from an input information signal which includes said synchronizing signal, comprising:

(A) a peak clamp circuit for receiving the information signal and outputting a peak-clamped information signal;

(B) a pulse clamp circuit for receiving the information signal and outputting a pulse-clamped information signal; and (C) a comparison circuit for receiving one of the peak-clamped signal and the pulse-clamped signal selectively, comparing the received clamped signal with one of a slice level higher than the clamp level of said peak clamp circuit and a slice level lower than the clamp level of said pulse clamp circuit selectively, and separating and outputting the synchronizing signal.

2. A device according to claim 1, wherein said information signal includes an image signal reproduced from a recording medium.

3. A device according to claim 1, wherein said comparison circuit is arranged to receive selectively said peak-clamped signal after starting processing operation of said information signal processing device.

4. A device according to claim 3, wherein said comparison circuit is arranged to receive selectively said pulse-clamped signal after said synchronizing signal is separated from said peak-clamped signal by comparing said peak-clamped signal with the selected slice level in said comparison circuit.

5. An information signal processing device for separating a synchronizing signal from an input information signal which includes said synchronizing signal, comprising:

(A) a peak clamp circuit for receiving the information signal and outputting a peak-clamped information signal;

(B) a pulse clamp circuit for receiving the information signal, pulse-clamping said input information signal in accordance with a clamp pulse, and outputting a pulse-clamped information signal;

(C) a comparison circuit for receiving one of the peak-clamped signal and the pulse-clamped signal selectively, comparing the received clamped signal with a predetermined level, and separating and outputting the synchronizing signal; and (D) a clamp pulse generator for generating said clamp pulse according to said synchronizing signal separated and output from said peak-clamped signal by comparing said peak-clamped signal with the predetermined level in said comparison circuit 6. A device according to claim 5, wherein said pulse clamp circuit is arranged so as to clamp a pedestal level of the input information signal in accordance with said clamp pulse generated from said clamp pulse generator.

7. A device for separating a synchronizing signal from an input information signal which includes said synchronizing signal, comprising:

a peak clamp circuit for receiving the input information signal and outputting a peak-clamped information signal;

a pulse clamp circuit for receiving the peak-clamped information signal and for selectively outputting one of the peak-clamped information signal and a pulse-clamped information signal; and a comparison circuit for receiving the selected signal output from said pulse clamp circuit, comparing the selected signal to a predetermined level, and separating and outputting the synchronizing signal.

8. A device according to claim 7, wherein said pulse clamp circuit includes a clamp pulse generator for generating a clamp pulse according to said synchronizing signal output by said comparison circuit when the peak-clamped signal is received, and said pulse clamp circuit is arranged so as to pulse-clamp the peak-clamped information signal in accordance with said clamp pulse generated from said clamp pulse generator.

9. A device according to claim 8, wherein said pulse clamp circuit selectively outputs the peak-clamped signal when said pulse clamp circuit receives the peak-clamped signal and said comparison circuit is not outputting the synchronizing signal.

10. A device according to claim 8, wherein said pulse clamp circuit selectively outputs the pulse-clamped signal when said pulse clamp circuit receives the peak-clamped signal and said comparison circuit is outputting the synchronizing signal.

* * * * *

UNITED STATES PATENT AND TRADEMARK OFFICE
CERTIFICATE OF CORRECTION

PATENT NO. : 5,260,790

DATED : November 9, 1993

INVENTOR(S) : MAKOTO TAKAYAMA

It is certified that error appears in the above-indentified patent and that said Letters Patent is hereby corrected as shown below:

<u>In The Drawings:</u>
Sheet 1 of 6; Fig. 2, "LEVL" should read --LEVEL--.

Signed and Sealed this

Nineteenth Day of July, 1994

Attest:

BRUCE LEHMAN

*Attesting Officer*    Commissioner of Patents and Trademarks